April 19, 1927.
H. C. PICKEL
ROAD PLANER
Filed Sept. 20, 1926 2 Sheets-Sheet 2
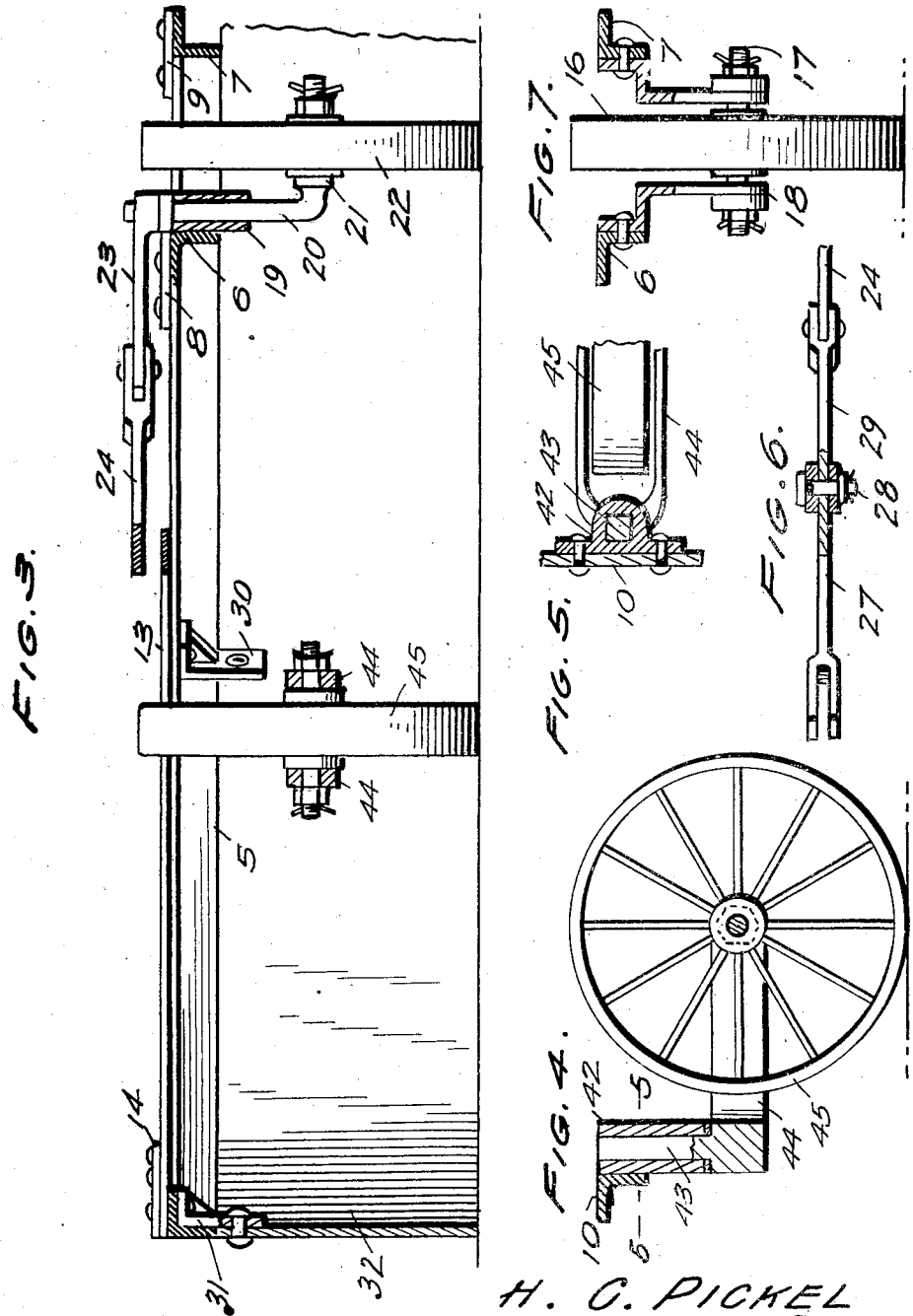

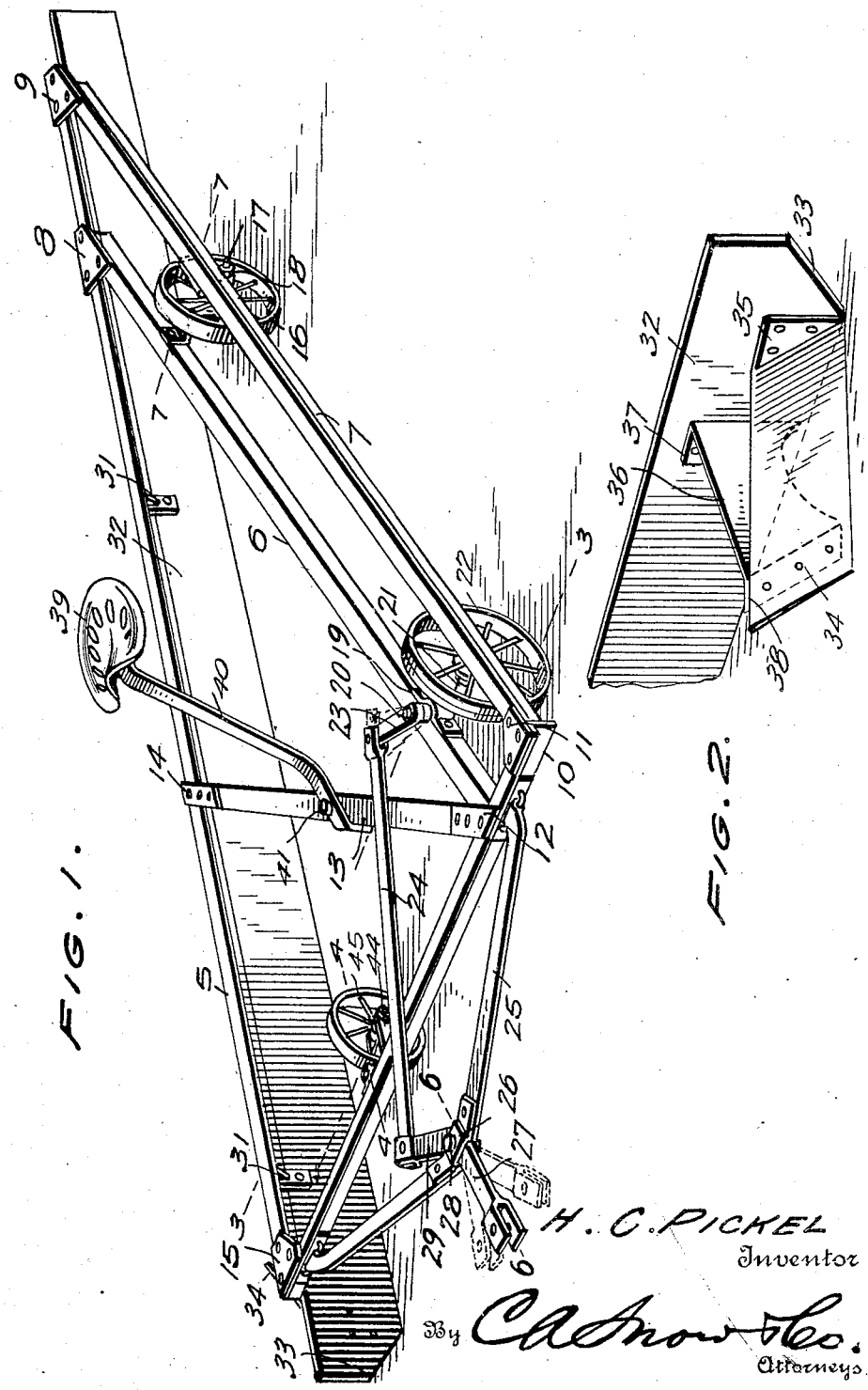

Patented Apr. 19, 1927.

1,624,971

UNITED STATES PATENT OFFICE.

HENRY C. PICKEL, OF PEMBERTON, MINNESOTA.

ROAD PLANER.

Application filed September 20, 1926. Serial No. 136,579.

This invention relates to road machines, and aims to provide a novel form of machine especially designed for leveling gravel roads.

The primary object of the invention is to provide a machine of this character including an elongated blade supported in such a way that the same will not slide laterally to cause an uneven leveling of the road surface.

Another object of the invention is to provide means at one end of the blade for cutting a sod or grass at one edge of the road to trim the edge of the road simultaneously with the leveling or planing thereof.

A still further object of the invention is the provision of a planer embodying a three-point suspension, to the end that the blade may ride over car tracks, stones or other obstructions without injury to the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a perspective view of a road machine constructed in accordance with the invention.

Figure 2 is a fragmental perspective view illustrating the outer forward end of the blade of the machine.

Figure 3 is a sectional view taken on line 3—3 of Figure 1.

Figure 4 is a sectional view taken on line 4—4 of Figure 1.

Figure 5 is a sectional view taken on line 5—5 of Figure 4.

Figure 6 is a sectional view taken on line 6—6 of Figure 1.

Figure 7 is a sectional view taken on line 7—7 of Figure 1.

Referring to the drawings in detail, the machine embodies a frame which is substantially triangular in formation, the same including an angle bar 5, a pair of spaced angle bars 6 and 7 respectively connected at their rear ends to the angle bar 5 by means of the plates 8 and 9.

The forward ends of the angle bars 6 and 7 connect with the angle bar 10 or front bar of the frame of the machine, connection being made with the bar 10 through the medium of the plates 11 and 12 respectively. A brace bar 13 is connected to the angle bar 5 by means of plate 14, the opposite end thereof being connected with the bar 10, by means of the plate 12 which also acts as a means to secure the bar 6 to the bar 10, as before stated. Thus it will be seen that due to this bar 13, the frame of the machine is held rigid at all times.

The reference character 15 indicates a securing plate that secures the bar 5 and bar 10 together in such a way as to insure against movement of the bars 5 and 10 with respect to each other.

At the rear of the machine, is a wheel 16 mounted on the axle 17 that in turn operates in bearings 18 supported between the bars 6 and 7. Secured to the outer surface of the bar 6 adjacent to the forward end thereof, is a strap 19 that provides a bearing for the vertical portion 20 of the axle 21 on which the wheel 22 operates, the axle being connected with the arm 23 that in turn has connection with the rear end of the bar 24 so that movement of the bar 24 will produce a relative movement of the arm 23 and axle 21 to move the wheel 22 and guide the machine.

Pivotally supported at the forward end of the machine, is a yoke 25 that is provided with an eye 26 through which the bell crank lever 27 extends, the bell crank lever being pivotally supported by means of the bolt 28. As shown by Figure 1, the bar 24 connects with one end of the bell crank lever at 29 to the end that pivotal movement of the bell crank lever will cause a movement of the bar 24 to accomplish the steering of the vehicle.

The bell crank lever affords means whereby a suitable power device not shown may be connected with the machine in such a manner that as the power device turns, a similar turning of the machine will result and the machine will be properly guided in operation.

Depending from the bar 5 are brackets 30 and 31 to which the planing blade 32 is connected, the connection being such that movement of the blade with respect to the frame of the machine is prevented. The forward edge of the blade is cut away at 33 so that the blade may ride over obstructions in the road surface such as car tracks, stones or the like.

In order that the blade may operate to trim the edge of the road, a cutting blade 34 is provided, the same having one of its edges bent laterally at 35, where it is secured to the blade 32 and held against movement with respect thereto.

The rear end of the cutting blade 34 is held in its active position by means of the bracing member 36 which has the right angled extremity 37, which is secured to the blade 32 and a right angled extremity 38 secured to the blade 34. Thus it will be seen that as the machine is moved along the road surface, the blade 34 will trim the edge of the road.

It might be further stated that the operator's seat, which is indicated at 39 is supported at the upper end of the seat post 40, which has its lower end positioned around the bar 13 and secured by means of bolt 41.

Secured to the bar 10 is a bearing 42 formed with a substantially square opening to accommodate the square shaft 43 of the forks 44 within which the wheel 45 is mounted, so that the wheel 45 may slide vertically in the bearing 42 permitting the machine to move vertically independently of the wheel 45.

It is thought that in view of the foregoing detail construction, the construction and operation of the machine is clearly set forth.

I claim:—

A road machine including a triangular frame, said frame embodying a front bar, a pair of spaced side bars and an obliquely disposed bar, wheels mounted between the bars of the pair of bars, a blade supported by one of the bars, a cutting blade carried at the forward end of the first mentioned blade, and one of said wheels being pivotally supported to move in a horizontal plane to guide the machine.

In testimony that I claim the foregoing as my own, I have hereto affixed my signature.

HENRY C. PICKEL.